United States Patent [19]

Yuan

[11] 4,280,021

[45] Jul. 21, 1981

[54] MESSAGE WAITING SYSTEM

[75] Inventor: William K. C. Yuan, LaGrange, Ill.

[73] Assignee: Entel Corporation, Riverside, Ill.

[21] Appl. No.: 59,960

[22] Filed: Jul. 23, 1979

[51] Int. Cl.³ .............................................. H04M 3/42
[52] U.S. Cl. .................................................... 179/84 C
[58] Field of Search ................. 179/81 C, 84 C, 84 L, 179/99

[56] References Cited

U.S. PATENT DOCUMENTS

| 3,050,592 | 8/1962 | Burgener | 179/84 C |
|---|---|---|---|
| 3,826,876 | 7/1974 | Gueldenpfenning et al. | 179/84 C |
| 3,934,098 | 1/1976 | Merritt, Jr. | 179/84 C |

*Primary Examiner*—Joseph A. Popek
*Attorney, Agent, or Firm*—Irwin C. Alter; Phillip A. Weiss

[57] ABSTRACT

A message waiting feature added to a PABX using the attendant's console and busy lamp field. The message waiting indication is provided by causing the busy lamp associated with the subscriber station that has the message waiting to blink.

10 Claims, 2 Drawing Figures

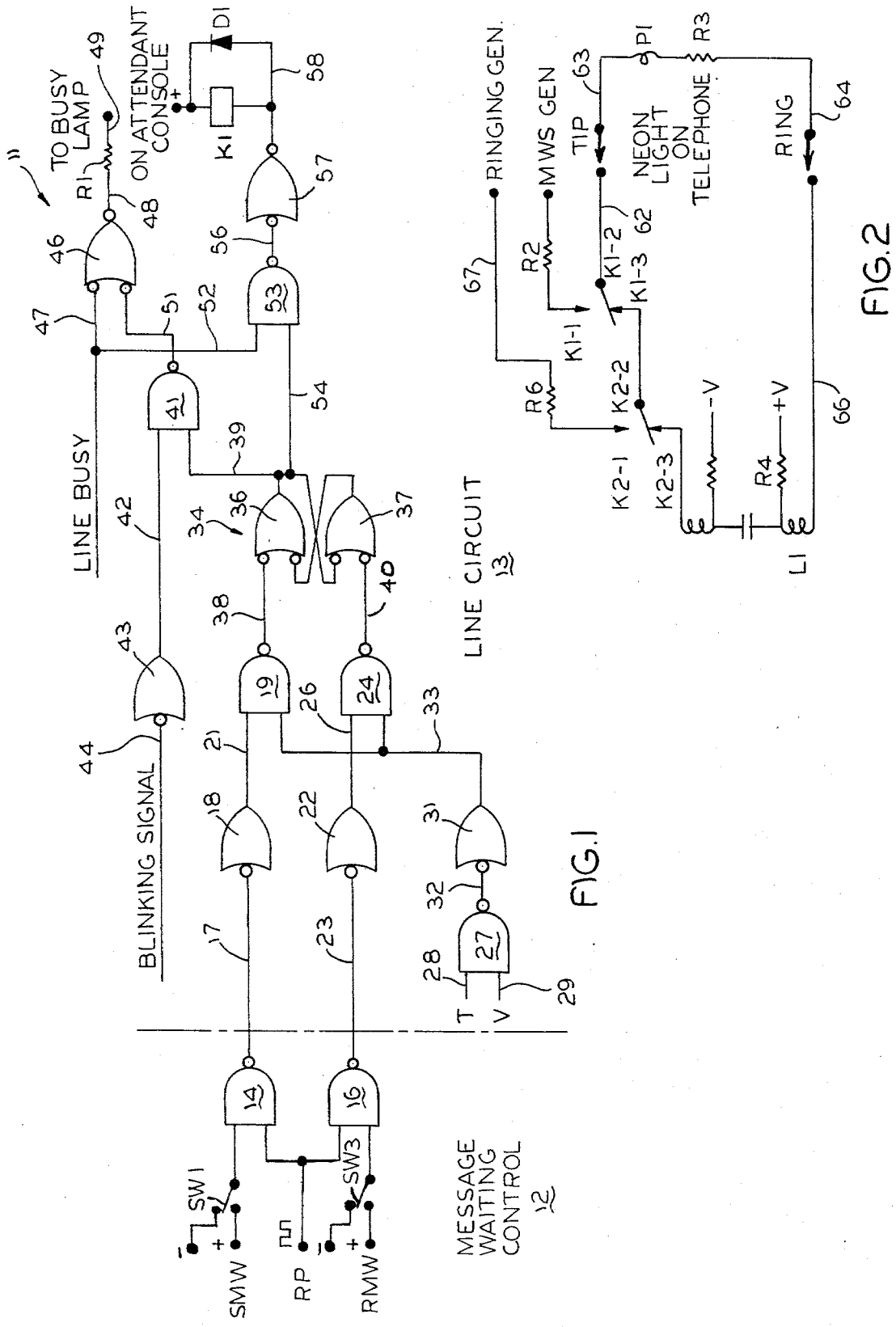

MESSAGE WAITING SYSTEM

This invention has to do with PABX systems; and more particularly, with such systems that have facilities for indicating to the attendant that there is a message waiting for a party at a particular substation.

Message waiting systems are particularly useful in hotels, motels and the like. When a clerk or telephone operator receives a message for an unavailable guest, the message is left in a box associated with the guest's room. The message waiting system provides a means for signaling the guest in his room that there is a message waiting for him. Presently, there are stand alone message waiting systems. A light is mounted on a panel in the guest's room. At the front desk there is a message waiting control console or panel where there are switches to turn on the light in the guest's room and also an indicator light to tell the attendant which rooms have messages. This approach involves a lot of wiring.

Another approach is to involve the telephone set with message waiting. There is a light on the telephone set. The message waiting control panel is connected to the telephone system. The telephone system provides means of lighting the message waiting light on the telephone instrument. Thus, the present message waiting systems require extensive additional wiring, control and indicating devices.

The attendant console with busy lamp field, besides servicing calls, can set and reset message waiting lights on the telephone in the guest's rooms and the busy lamp on the console, besides indicating the line is busy, is made to provide indication to the attendant which rooms have messages waiting.

Accordingly, an object of the present invention is to provide improved message waiting systems.

Another object of the present invention is to integrate the message waiting system completely with the telephone system.

Yet another object of the present invention is to provide message waiting systems that use the field of busy lights for indicating to the attendants that a particular substation has a message waiting.

Yet another object of the present invention is to provide message waiting systems using the busy lamp field of the attendant console to indicate whether a line is (a) busy, (b) idle, no message waiting, or (c) idle, with a message waiting.

Yet another object of the present invention is to provide blinking signals to selected busy lamps on the attendant's console to indicate a message waiting and simultaneously to energize a message waiting indication at the subscriber station.

Yet another object of the present invention is to provide improved message waiting systems wherein the message waiting condition can be deactivated by the console keys.

Yet another object of the present invention is to provide improved message waiting systems wherein a message waiting operating component remains unoperated, if the line that has the message waiting is busy.

A preferred embodiment of the present invention comprises an attendant console having a field of busy lamps. Key means are provided at the attendant's console for actuating a message waiting condition.

The attendant then dials or uses a key pad for selecting the subscriber station that has the message waiting. A flip-flop circuit in the line circuit is associated with the subscriber station that has the message waiting, and the flip-flop circuit is set during the time frame of a ready pulse responsive to the selection of the subscriber station, when the line circuit is placed in the message waiting condition. The flip-flop circuit provides an operating signal to a message waiting relay at the subscriber substation. Responsive to the energization of the message waiting relay a message waiting signal generator is connected to the subscriber station to cause a light on the telephone to blink with the blinking of the lamp in the attendant's console.

When the telephone signalled party receives the message, the attendant operates another key means and again dials or uses the key pad to select the right subscriber station for removing the blinking signal from the busy lamp and returning the message waiting relay to normal.

The above-mentioned and other objects and features of the present invention will be best understood by making reference to the accompanying drawings:

FIG. 1 is a schematic diagram of the improved message waiting system circuitry; and FIG. 2 is a schematic showing of the improved message waiting system circuitry for operating a signal device at the subscriber station.

In FIG. 1 the message waiting system 11 is shown divided into a message waiting control portion 12 at the attendant's console and the line circuit portion 13. In the control portion 12 there is shown a pair of gates 14 and 16. One of the inputs to gate 14 is connected through a message waiting key SW1 to a high or positive signal. The other input of gate 14 is connected to a ready pulse source. One of the inputs to gate 16 is also connected to the ready pulse source. The other input to gate 16 comes through key SW3 to a message waiting reset high or positive voltage source.

The output of gate 14 is connected through conductor 17 to inverter gate 18. The output of gates 14 and 16 are low, when both inputs to the gates are high. Thus, the output of inverter gate 18 is high, when both inputs to gate 14 are high. The output of gate 18 is coupled to NAND gate 19 through conductor 21. The output of gate 16 is coupled to an inverter gate 22 through conductor 23. The output of inverter gate 22 is coupled to one input of NAND gate 24 through conductor 26.

It should be understood that the outputs of gates 18 and 22 are connected to a plurality of NAND gates, such as NAND gates 19 and 24. Particular NAND gates are selected responsive to the attendant keying in particular tens and unit numbers to activate a particular gate, such as NAND gate 27.

Thus, for example, when the attendant dials 51, then there is a high provided to the ten conductor 28 connected to the input of NAND gate 27. Similarly, when one is dialed, there is a high on conductor 29, the other input to NAND gate 27. Thus, with two highs at the input, AND gate 27 provides a low at its output. The low is transmitted to inverter gate 31 through conductor 32. The output of the inverter gate 31 is high and this high is carried by conductor 33 to the second input of gates 19 and 24, thereby enabling those gates.

Gate 19 is coupled to the SET input of flip-flop circuit 34. Gate 24 is coupled to the RESET input of flip-flop circuit 34. The flip-flop circuit comprises a pair of NAND gates 36 and 37. When the low of gate 19 is transmitted to the set input at gate 36 through conductor 38, then the flip-flop unit 34 provides a high output at conductor 39 which is coupled directly to one input of NAND gate 41. The NAND gate 41 is thereby enabled. A blinking signal is attached to the other input of gate 41 through conductor 42 and inverter gate 43. While the blinking signal at the input to gate 41 is high, the output of gate 41 is low.

An OR gate 46 provides either a steady busy signal to the busy lamp field, if the line is busy, or a blinking signal to the busy lamp, if there is a message waiting condition. A low at the input to gate 46 that is attached to conductor 47 energizes the busy lamp with the consequent low at the output of gate 46 on conductor 48. The low is transmitted through resistor R1 and conductor 49 to the selected busy lamp. If there is no busy signal at the input to gate 46, then the blinking signal at the output of gate 41 on conductor 51 is connected through gate 46, conductor 48, dropping resistor R1 and conductor 49 to the busy lamp. If both a steady busy signal and a blinking message waiting signal are available, then the steady signal in effect swamps the blinking signal and the selected lamp burns continuously.

The normally low busy signal is also conducted through conductor 52 to one input of NAND gate 53, preventing gate 53 from producing a low output. The other input of NAND gate 53 is the output of the flip-flop circuit 34 transmitted through conductor 54. When there is no busy signal on conductor 47, then there is a high at the input of gate 53 transmitted through conductor 52. When the flip-flop is set, the two highs at the input of gate 53 produce a low output which is carried by conductor 56 to OR gate 57. The output of gate 57, which is low, is transmitted to the relay K1 over conductor 58. Since the message waiting relay K1 is normally connected to high voltage, it is energized when the flip-flop is set and there is no busy signal. A diode D1 is shown bridging relay K1 to suppresses line surges.

When the line is busy, or when the flip-flop 34 is not set, there is a low on conductors 47 and 52 or a low on conductor 54, then the output of gate 53 is high. The output of OR gate 57 stays high and the message waiting relay K1 does not operate. However, when the signal on 47 is high; i.e., no busy signal, the blinking signal passes through gate 46 and is carried on conductor 48 through resistor R1 and conductor 49 to the busy lamp which blinks. Relay K1 also operates responsive to the high or set output of flip-flop unit 34. The operation of relay K1 connects the contacts K1-1 to K1-2 which couples the message waiting signal generator through the tip leads to the neon light on the telephone. More particularly, the message waiting generator is connected to energize the pilot light at the telephone through a circuit that includes resistor R2 contacts K1-1 and K1-2 of relays K1, conductor 62, the tip conductor 63, the neon light P1, resistor R3, ring conductor 64, conductor 66, coil L1 and resistor R4 to positive voltage.

It is noted that the ringing circuit at the telephone set uses a portion of the same circuitry where the ringing generator is connected over a circuit that includes conductor 67, resistor R6, contacts K2-1, K2-2, conductor 62, and the circuitry previously traced. The message waiting circuitry uses the busy lamp field by providing a blinking signal to the selected busy lamp, when there is a message waiting. Simultaneously, the message waiting relay is operated connecting the message waiting generator to a pilot light on the telephone. No additional wiring is required to operate the selected light in the attendant's console indicating the message waiting condition, and no special field of lights is required to indicate a message waiting signal for a particular telephone.

The message waiting generator frequency is in the order of 100 Hertz or over three times the ring generator frequency. Thus, the message waiting signal does not affect the ringer.

If the line circuitry is set in a message waiting condition, and the telephone goes off hook, the message waiting indicating relay returns to the normal, unoperated condition, because gate 53 receives one high and one low input signal. The telephone circuit thus is returned to its calling or called mode. When the telephone is restored to the hook switch, the message waiting relay operates again and the pilot light blinks again.

Means are provided to remove the message waiting condition. More particularly, operating the reset message key SW3 puts a high on the other input to gate 16. The output of gate 16 goes low causing the output of the inverting gate 22 to go high. When the subscriber number is keyed in the highs at the input of the selected AND gate, such as gate 24, cause a low on conductor 40 at the reset input of flip-flop 34. The low signal on the high input causes a low at the flip-flop output.

To operate the improved message waiting system, the attendant merely pushes the message waiting signal key to provide a message waiting signal to gate 14; after that, the attendant keys in the number of the station that has the message waiting. Responsive to keying of that number, a ready pulse is generated and connected to gate 14. The gate 14 provides a signal to operate a selected flip-flop circuit which provides a signal to a gate enabling the passage therethrough of a blinking signal indicative of the message waiting condition. Another gate passes either the steady line busy signal or the blinking signal.

The output of the flip-flop is also used to operate a message waiting relay, if the line is not busy. The activated message waiting relay energizes the indicating lamp at the telephone. If the line is busy, the message waiting relay cannot be activated and the selected busy lamp on the attendant's console remains steady. A message waiting reset key SW3 and the key pad on the attendant's console are operated by the attendant to release the message waiting components after the message waiting signal has been acknowledged.

While the principles of the invention have been described above in connection with specific apparatus and applications, it is to be understood that this description is made by way of example only, and not as a limitation on the scope of the invention.

I claim:

1. An improved message waiting system for use with PABX systems having attendant's console means and busy lamp field means for indicating a busy condition of any subscriber station by providing a steady signal to the lamp in the field means corresponding to the busy subscriber station, said improved message waiting system comprising
message waiting control means at said console means for operation by the attendant for initiating a message waiting condition,
a first message waiting signal source,
selecting means for selecting the busy lamp in the busy lamp field means representing the desired station that has the message waiting, and
means for connecting the first message waiting signal source to the selected busy lamp to thereby indicate the message waiting condition.

2. The improved message waiting system of claim 1 including means for cancelling the message waiting condition, and means responsive to the cancellation of said message waiting condition for disconnecting the first message waiting signal source from the selected busy lamp.

3. The improved message waiting system of claim 2 wherein said selecting means comprises a plurality of selection gates, each of said selection gates being operated by the keying in of particular digits, and line circuit gate means in each line circuit associated with each subscriber station operated in response to the initiation of said message waiting condition and a simultaneous signal from a particular one of said selection gate means.

4. The improved message waiting system of claim 3 including flip-flop means to provide a set output, means for setting said flip-flop means responsive to a signal from said line circuit gate means, said means for connecting said first message waiting signal source to said selected busy lamp comprising message waiting signal gate means operated responsive to the set output of said flip-flop means, and OR gate means operated responsive to the operation of said message waiting condition signal gate means or to a line busy signal for operating said selected busy lamp responsive to either a line busy condition signal or said first message waiting condition signal.

5. The improved message waiting system of claim 4 wherein neon station lamp means are provided at said subscriber station, and connecting means at said subscriber station for connecting the second message waiting signal source to said lamp means responsive to said set signal from said flip-flop means.

6. The improved message waiting system of claim 5 wherein said connecting means comprises relay means, and relay NAND gate means for providing an operating signal to said relay means responsive to the set signal from the said flip-flop means and no busy signal from said desired subscriber station.

7. The improved message waiting system of claim 6 wherein said means for cancelling said message waiting signal comprises means for resetting said flip-flop means.

8. The improved message waiting system of claim 1 wherein station lamp means for provided at said subscriber stations, and coupling means for coupling said station in the desired subscriber station lamp to a second message waiting signal source responsive to a message waiting condition.

9. The improved message waiting system of claim 8 and means for preventing the operation of said coupling means station responsive to said desired subscriber station being in the busy condition.

10. The improved message waiting system of claim 9 wherein when said busy condition no longer exists, said coupling means operates.

* * * * *

UNITED STATES PATENT AND TRADEMARK OFFICE
CERTIFICATE OF CORRECTION

PATENT NO. : 4,280,021
DATED : July 21, 1981
INVENTOR(S) : William K. C. Yuan

It is certified that error appears in the above-identified patent and that said Letters Patent are hereby corrected as shown below:

Col. 2, line 57: "AND" should be --NAND--;

Col. 3, line 35: "suppresses" should be --suppress--;

Col. 4, line 21: "AND" should be --NAND--;

Col. 6, line 20: "for" should be --are--.

Signed and Sealed this

Seventeenth Day of November 1981

[SEAL]

Attest:

Attesting Officer

GERALD J. MOSSINGHOFF

Commissioner of Patents and Trademarks